(12) United States Patent
Sonnenmoser et al.

(10) Patent No.: US 11,542,121 B2
(45) Date of Patent: Jan. 3, 2023

(54) REMOTE ELEVATOR MONITORING AND INSPECTION

(71) Applicant: Inventio AG, Hergiswil (CH)

(72) Inventors: Astrid Sonnenmoser, Hochdorf (CH); Martin Kusserow, Lucerne (CH); Reto Tschuppert, Lucerne (CH)

(73) Assignee: INVENTIO AG, Hergiswil (CH)

( * ) Notice: Subject to any disclaimer, the term of this patent is extended or adjusted under 35 U.S.C. 154(b) by 1070 days.

(21) Appl. No.: 16/305,920

(22) PCT Filed: May 31, 2017

(86) PCT No.: PCT/EP2017/063085
§ 371 (c)(1),
(2) Date: Nov. 30, 2018

(87) PCT Pub. No.: WO2017/207597
PCT Pub. Date: Dec. 7, 2017

(65) Prior Publication Data
US 2020/0339384 A1 Oct. 29, 2020

(30) Foreign Application Priority Data
May 31, 2016 (EP) .................................... 16172280

(51) Int. Cl.
*B66B 5/00* (2006.01)
*B64C 39/02* (2006.01)
*B66B 1/34* (2006.01)
(Continued)

(52) U.S. Cl.
CPC .......... *B66B 5/0018* (2013.01); *B64C 39/024* (2013.01); *B66B 1/3461* (2013.01);
(Continued)

(58) Field of Classification Search
CPC ... B66B 5/0018; B66B 1/3461; B66B 5/0006; B66B 5/0087; B64C 39/024;
(Continued)

(56) References Cited

U.S. PATENT DOCUMENTS 8,874,283 B1 * 10/2014 Cavote .................. B64C 39/024
701/28
9,505,494 B1 * 11/2016 Marlow ............... G05D 1/0094
(Continued)

FOREIGN PATENT DOCUMENTS

EP 1415947 A1 5/2004
EP 1670178 A1 6/2006
(Continued)

*Primary Examiner* — Dale W Hilgendorf
(74) *Attorney, Agent, or Firm* — William J. Clemens; Shumaker, Loop & Kendrick, LLP

(57) ABSTRACT

A method and system for inspecting and monitoring an elevator installation includes sending an autonomous flying object having at least one sensor to the elevator installation, and granting access to a hoistway of the elevator installation to the autonomous flying object. The autonomous flying object is positioned within the hoistway, and data collected by the associated sensor is sent to a remote elevator service center. The autonomous flying object and the associated sensor can be used to monitor and inspect the elevator installation on a temporary basis, for example for a specific number of hours, days or weeks. Once the autonomous flying object has gained access to the hoistway, the elevator installation can resume normal operation thereby keeping downtime to a minimum. After completing its tasks at one elevator installation, the autonomous flying object can be directed by the remote elevator service center to monitor and inspect another elevator installation.

12 Claims, 2 Drawing Sheets

(51) Int. Cl.
*H04L 67/125* (2022.01)
*H04Q 9/00* (2006.01)
*G01J 5/00* (2022.01)
*H04N 7/18* (2006.01)

(52) U.S. Cl.
CPC .......... *B66B 5/0006* (2013.01); *B66B 5/0087* (2013.01); *H04L 67/125* (2013.01); *H04Q 9/00* (2013.01); *B64C 2201/12* (2013.01); *B64C 2201/141* (2013.01); *G01J 2005/0077* (2013.01); *H04N 7/185* (2013.01); *H04Q 2209/82* (2013.01)

(58) Field of Classification Search
CPC .......... B64C 2201/12; B64C 2201/141; H04L 67/125; H04Q 9/00; H04Q 2209/82; G01J 2005/0077; H04N 7/185
See application file for complete search history.

(56) References Cited

U.S. PATENT DOCUMENTS

| | | | |
|---|---|---|---|
| 10,250,821 B2 * | 4/2019 | Pulleti | B64C 39/02 |
| 10,825,337 B2 * | 11/2020 | Piech | B64C 39/024 |
| 2016/0023761 A1 | 1/2016 | McNally | |
| 2016/0223120 A1 * | 8/2016 | Gagliardo | F16L 55/1645 |
| 2017/0015414 A1 * | 1/2017 | Chan | H02G 1/02 |
| 2017/0066530 A1 * | 3/2017 | Salzmann | G05D 1/0094 |
| 2017/0092109 A1 * | 3/2017 | Trundle | G08B 25/006 |
| 2018/0089622 A1 * | 3/2018 | Burch, V | G01S 19/49 |
| 2018/0244387 A1 * | 8/2018 | Russell | B64C 39/024 |
| 2019/0318613 A1 * | 10/2019 | Piech | B64C 39/024 |
| 2021/0192629 A1 * | 6/2021 | Tofte | B64C 39/024 |

FOREIGN PATENT DOCUMENTS

| | | | | |
|---|---|---|---|---|
| JP | 2004018174 A | | 1/2004 | |
| JP | 2010189162 A | | 9/2010 | |
| JP | 2015030604 A | * | 2/2015 | ............ B66B 5/00 |
| JP | 2015030604 A | | 2/2015 | |
| KR | 102090170 B1 | * | 6/2020 | ......... B64C 39/024 |
| RU | 2200900 C2 | | 3/2003 | |
| RU | 69047 U1 | | 12/2007 | |
| RU | 2330806 C1 | | 8/2008 | |
| WO | 2013104691 A1 | | 7/2013 | |
| WO | WO-2013104691 A1 | * | 7/2013 | ......... B64C 39/024 |
| WO | 2016076586 A1 | | 5/2016 | |

* cited by examiner

REMOTE ELEVATOR MONITORING AND INSPECTION

FIELD

The present invention relates to a method and system for remotely monitoring and inspecting an elevator installation.

BACKGROUND

Conventionally remote monitoring of elevators has been undertaken by providing multiple, dedicated sensors within the elevator installation to collect diagnostic data concerning the installation and to report any unusual or irregular states of the elevator to a remote service center by means of a communications network. The analysis of the data collected from the sensors can be performed locally, for example using a microprocessor and memory in an elevator controller, or alternatively the data can be transferred directly via the communications network so that the analysis can be conducted within a processor in the remote service center. Such systems and methods have been described in published patent documents EP1670178 and EP1415947.

The use of permanently installed sensors to continuously collect diagnostic data concerning the installation together with the associated storage, transmission and processing of that data can be deemed disproportionate or excessive since the unusual, irregular or faulty states of the elevator that the sensors detect occur only very infrequently.

Another traditional way of inspecting the installation is to send a service technician to the site to conduct the inspection manually, however for safety reasons such manual inspection necessarily requires the elevator to be taken out of commission. This downtime can cause considerable inconvenience to users of the elevator.

SUMMARY

It is an objective of the present invention to indicate a system and method for remote monitoring and inspection of an elevator installation of the kind stated in the introduction which provides a high degree of flexibility in the selection and configuration of the remote monitoring functions and which proves to be economic. In particular it is an objective of the present invention to dispense with permanently installed sensors to continuously collect diagnostic data concerning the installation and/or reduce downtime of the installation during monitoring and inspection.

The method of inspecting and monitoring an elevator installation comprises the steps of providing an autonomous flying object, the autonomous flying object having at least one sensor, sending the autonomous flying object to the elevator installation, selectively providing the autonomous flying object access to a hoistway of the elevator installation, positioning the autonomous flying object within the hoistway, and sending data collected by the sensor of the autonomous flying object to a remote elevator service center.

Accordingly, the autonomous flying object and associated sensor can be used to monitor and inspect the elevator installation on a temporary basis, for example for a specific number of hours, days or weeks. Furthermore, once the autonomous flying object has gained access to the hoistway, the elevator installation can resume normal operation thereby keeping downtime to a minimum. Furthermore, after completing its tasks at one elevator installation, the autonomous flying object can be directed by the remote elevator service center to monitor and inspect another installation.

Preferably, the remote elevator service center sends an installation identification to the autonomous flying object. The installation identification typically includes the geographical coordinates for the installation, the altitude the autonomous flying object must be at in order to gain access to the installation and the trajectory the autonomous flying object must take to gain access to the installation.

Additionally, it is important for security that only an authorized autonomous flying object is permitted access to installation. Accordingly, the installation identification sent from the service center to the autonomous flying object may also include access information. This access information can include a date and time period on which the particular elevator installation will provide access to the autonomous flying object and/or may include a code which can be read wirelessly by a sensor at the installation to permit access.

Furthermore, the remote elevator service center can send a corresponding access instruction to the elevator installation and specifically to an elevator controller. That access instruction may include a date and a time period for which the elevator installation via the elevator controller provides the autonomous flying object access to the hoistway. The access instruction can also include a command for the elevator move to a preset location within its hoistway and to stop at that location for the time period.

Alternatively, if the access information provided to the autonomous flying object included a code, then this code can be communicated separately from the service center to the elevator installation via its controller and stored. When the autonomous flying object approaches the installation, the code can be read by a sensor for example by NFC, RF or other wireless technologies and passed onto the elevator controller. If the code read from the autonomous flying object matches the code communicated separately from the service center, then the elevator controller can selectively permit access for the autonomous flying object into the hoistway.

Preferably, the data collected by the sensor on the autonomous flying object can be sent wirelessly, for example by NFC, to the elevator controller which can subsequently forward that data over a telecommunications network to the remote service center. The data can be sent in real-time to the elevator controller. Alternatively the data collected by the sensor can be stored and subsequently sent at discrete time intervals to the elevator controller.

After completing its tasks within the elevator hoistway it is necessary to provide the autonomous flying object with an exit from the hoistway of the elevator installation. This step corresponds to the previously described step of allowing the autonomous flying object access to the hoistway. If the access information provided to the autonomous flying object included a predetermined time interval, for example a number of hours, days or weeks, for the duration of which the autonomous flying object must complete its task, then that same information can be communicated from the service center to the elevator installation so that it can selectively permit the autonomous flying object to leave or exit the hoistway after the predetermined time interval.

Alternatively, if the access information provided to the autonomous flying object included a specific code, then this code can be communicated separately from the service center to the elevator installation via its controller and stored. When the autonomous flying object approaches the access, the job code can be read by a sensor for example by NFC, RF or other wireless technologies and passed onto the elevator controller. If the code read from the autonomous flying object matches the code communicated separately from the service center, then the elevator controller can selectively permit exit of the autonomous flying object from the hoistway.

After leaving the hoistway of the elevator installation, the autonomous flying object can be either sent to another elevator installation to repeat its monitoring and inspecting tasks or to a base station.

The invention also provides a system for remotely inspecting and monitoring an elevator installation comprising a remote elevator service center, an autonomous flying object, the autonomous flying object having at least one sensor, an access within the elevator installation to selectively permit the autonomous flying object with entry to and exit from an elevator hoistway and a communication network to transmit data collected by the sensor to the remote elevator service center.

Preferably, the system further comprises a further sensor connected to an elevator controller to read a code from the autonomous flying object when it is in a vicinity of the further sensor. Accordingly, the elevator controller can grant access of the autonomous flying object to the hoistway when the code matches a code communicated separately from the service center to the elevator controller.

The elevator controller can open or unlock an access to permit the autonomous flying object into and out of the hoistway.

Preferably, data collected by the sensor is sent to the elevator controller and further transmitted over the communication network to the remote elevator service center.

DESCRIPTION OF THE DRAWINGS

Other objectives, features and advantages of the present invention will be apparent from the following detailed description of preferred embodiments thereof taken in conjunction with the accompanying drawings, in which.

DETAILED DESCRIPTION

Figure 1:
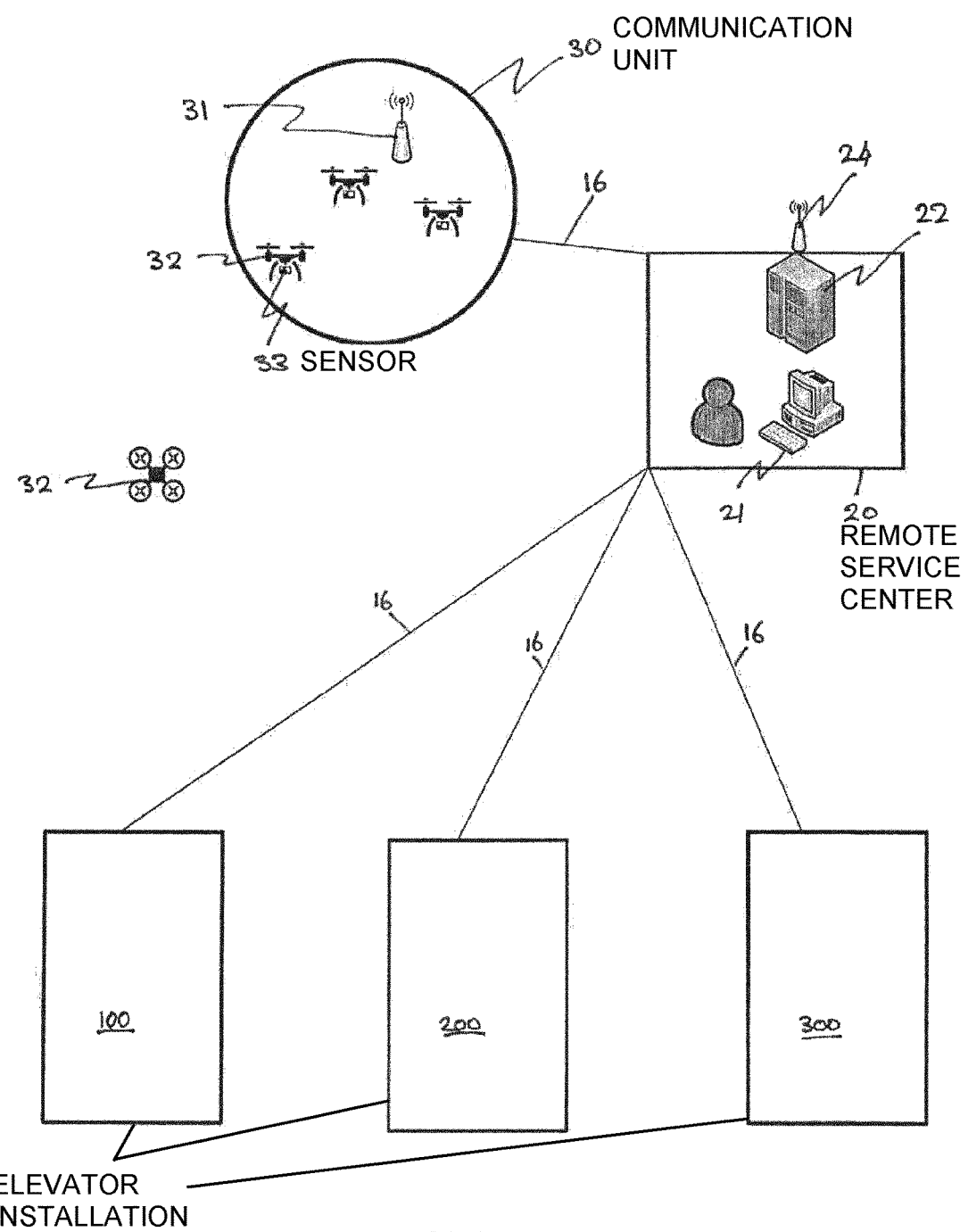
FIG. 1 is an exemplary schematic showing an arrangement of a system for remotely inspecting and monitoring a plurality of elevators.

FIG. 1 is an exemplary schematic showing an arrangement of a system for remotely inspecting and monitoring a plurality of elevator installations 100, 200 and 300. The system includes a remote service center 20 which regulates operation of the elevator installations and monitors and records the serviceability state of the elevator installations 100, 200 and 300. The service center 20 is composed of a computer system 21 and of a data bank 22 in which data relevant to serviceability state and operational state are filed. The computer system 21 and the data bank 22 are connected by way of a data bus. The data filed in the data bank 22 and/or actual operating data of an elevator installation 100 can be called up by way of the data bus with the help of additional data processing equipment and be further processed for additional evaluation. The service center 20 further includes a communication unit 24 enabling it to communicate with controllers within each of the elevator installations 100, 200 and 300. The communication unit 24 can also communicate with a corresponding communication unit 31 in a base station 30 for one or more autonomous flying objects 32. Preferably, the communication between the service center 20, the base station 30 and each of the elevator installations 100, 200 and 300 is by means of a wired or mobile telecommunications network 16.

The base station 30 accommodates multiple autonomous flying objects 32 such as drones. When not in use, the autonomous flying objects 32 can be charged at the base station 30. The base station 30 also houses a plurality of different sensors 33 which can be attached to the autonomous flying objects 32. These sensors 33 can be of any kind. Thus, use can be made of a camera, a microphone, an acceleration sensor, a temperature sensor, an air pressure sensor, a current sensor, a voltage sensor, a light sensor, a humidity sensor, a weight sensor, a speed sensor, a force sensor, a magnetic field sensor, a gyroscope, a position sensor, etc.

When remote monitoring and inspection of a particular elevator installation 100 is required, the service center 20 sends a request to the base station 30 which in turn instructs one of the autonomous flying objects 32 together with its sensor 33 to fly to the elevator installation 100. The request therefore necessarily comprises an installation identification typically including the geographical coordinates for the installation 100, the altitude the autonomous flying object 32 must be at in order to gain access to the installation 100 and the trajectory the autonomous flying object 32 must take to gain access to the installation 100.

Additionally, it is important for security that only an authorized autonomous flying object 32 is permitted access to installation 100. Accordingly, the request sent from the service center 20 to the autonomous flying object 32 via the base station 30 will also include access information. This access information can include a date and time period on which the particular elevator installation 100 will provide access to the autonomous flying object 32 and/or may include a specific job code which can be read by a sensor 49 (see FIG. 2) at the installation 100 to permit access.

Figure 2:
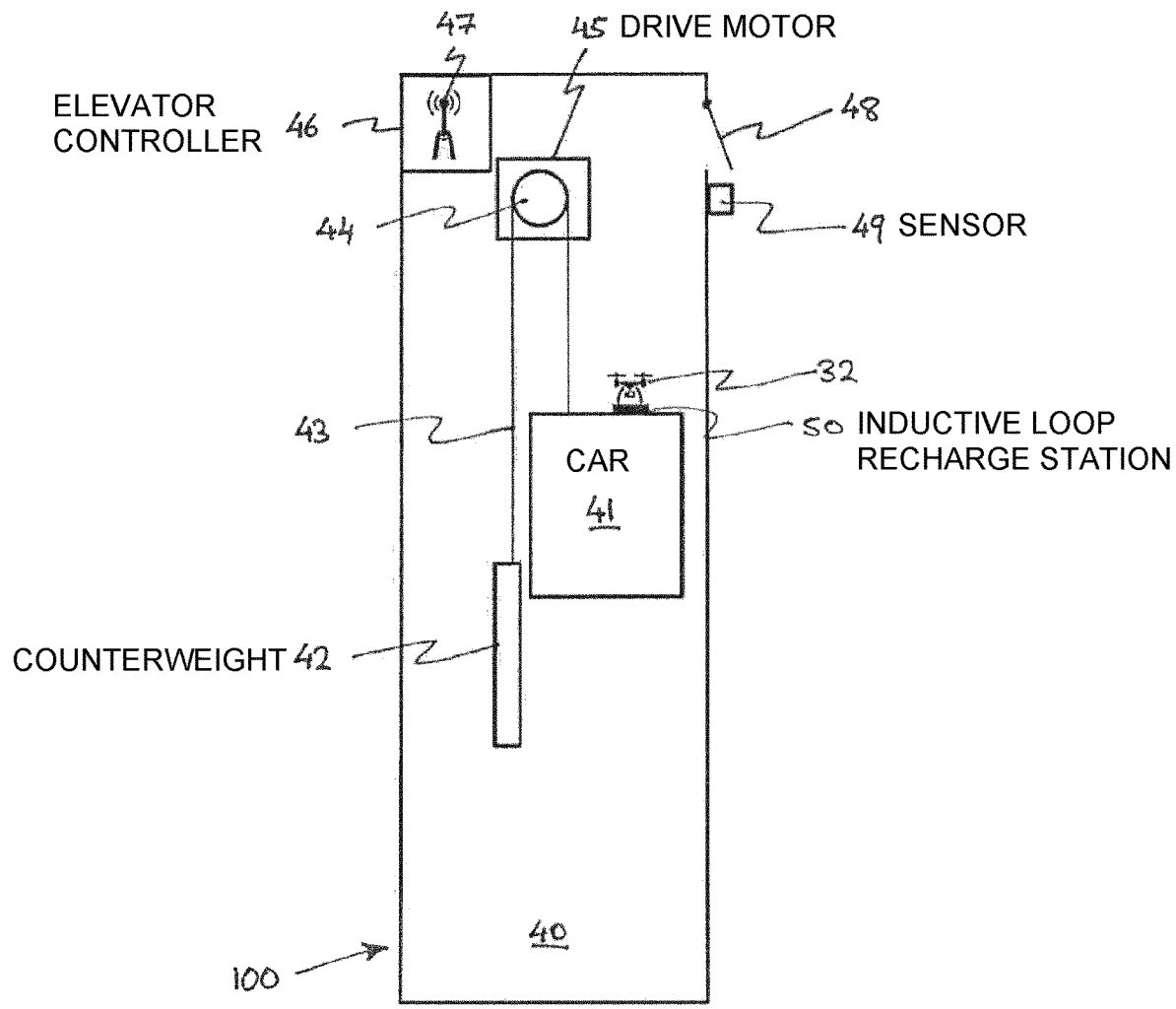
FIG. 2 is an illustration of one of the elevators of FIG. 1.

FIG. 2 is an illustration of one of the elevator installations 100 of FIG. 1. The elevator installation 100 includes an elevator car 41 and counterweight 42 movable in a hoistway 40. The elevator installation 100 can be, as in this example of a first embodiment, a single elevator or also, however, an installation with several elevators, which are linked into a group in terms of control within a building. The car 41 and counterweight 42 are suspended by a traction media 43 which is guided over a traction sheave 44. The traction sheave 44 is set in motion by means of the drive motor 45, which is supplied with electrical energy by way of an elevator controller 46. The elevator controller 46 additionally contains a communications module 47 enabling it to communicate with the service center 20 over the telecommunications network 16.

If the access information provided to the autonomous flying object 32 included a specific date and time period, that same information can be communicated from the service center 20 to the elevator controller 46 of the effected elevator installation 100 so that it can open or unlock a ventilation flap 48 in the hoistway for that particular time frame to permit access for the autonomous flying object 32 through the ventilation flap 48 and into the hoistway 40.

Alternatively, if the access information provided to the autonomous flying object 32 included a job code, again this code can be communicated separately from the service center 20 to the elevator controller 46 and stored. When the autonomous flying object 32 approaches the ventilation flap 48, the job code can be read by a sensor 49 for example by NFC, RF or other wireless technologies and passed onto the elevator controller 46. If the code read from the autonomous flying object 32 matches the code communicated separately from the service center 20, then the elevator controller 46 can open or unlock a ventilation flap 48 to permit access for the autonomous flying object 32 through the ventilation flap 48 and into the hoistway 40.

Preferably, before access has been granted to the autonomous flying object 32, the elevator controller 46 moves the elevator car 41 to a preset location within the hoistway 40 and stops at that location for a specific time period. This ensures that there are no moving components within the hoistway 40 as the autonomous flying object 32 moves into the hoistway 40.

Figure 3:
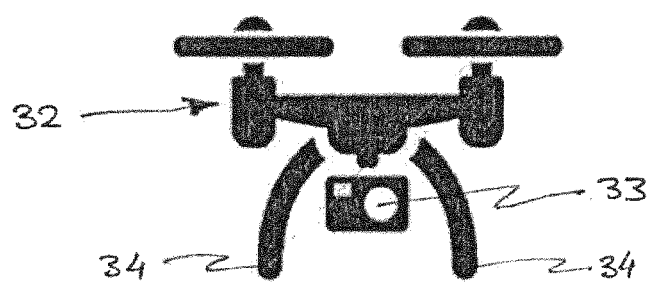
FIG. 3 is an exploded view of one of the autonomous flying objects from the system of FIG. 1.

Once inside the hoistway 40 the autonomous flying object 32 can be placed on or hover near a large array of elevator components. In the present example, the autonomous flying object 32 is arranged on an inductive loop recharge station 50 provided on top of elevator car 41 so that electrical power provided to the car 41 can additionally be used to recharge the autonomous flying object 32. Additionally, as shown in FIG. 3, magnets 34 can be incorporated into the base of the autonomous flying object 32. The magnets 34 should be of sufficient strength enabling a firm attachment of the autonomous flying object 32 to the car 41 both when the car 41 is stationary and during movement. However, the autonomous flying object 32 must be able to develop sufficient up-thrust to counteract the attractive force of the magnets 34 in order to detach itself from the car 41 when its monitoring and inspecting tasks are complete.

In the present embodiment with the autonomous flying object 32 positioned on top of an elevator car 41, it can use its sensor 33 to take pictures of guide shoes so that the remote service center 20 can subsequently detect wear, detect vibration as the car 41 travels through the hoistway 40 enabling the service center 20 to detect ride quality, detect noise levels to permit the service center 20 to monitor door operation or it can take a video allowing guide rail inspection remotely at the service center 20.

Similar tasks can be carried out by autonomous flying object 32 positioned on the counterweight 42.

Furthermore, if the autonomous flying object 32 is positioned on the elevator motor 45 an IR camera can be used as the sensor 33 to collect data regarding the temperature of the motor 45 to verify that it does not overheat and a vibration sensor can be used to collect motor vibration data.

Other possible tasks that the autonomous flying object 32 can conduct while inside the hoistway 40 include the monitoring or measurement of elongation of the traction media 43, record noise levels (for specific components or for the installation 100 as a whole), inspect the traction media 43, detect water in a pit of the hoistway 40, or remotely inspect a behavior of the installation 100 by streaming a video back to the remote service center 20. The person skilled in the art will appreciate that this is not an exhaustive list but that other tasks can be performed by the autonomous flying object 32 with different sensors 33 while in the hoistway 40.

Preferably, the data collected by the sensor 33 on the autonomous flying object 32 can be sent wirelessly, for example by NFC, to the elevator controller 46 which can subsequently forward that data over the telecommunications network 16 to the remote service center 20. The data can be sent in real-time to the elevator controller 46. Alternatively the data collected by the sensor 33 can be stored and is subsequently sent at discrete time intervals to the elevator controller 46.

After completing its tasks within the elevator hoistway 40 it is necessary to provide the autonomous flying object 32 with an exit from the hoistway 40 of the elevator installation 100. This step corresponds to the previously described step of allowing the autonomous flying object 32 access to the hoistway 40. If the access information provided to the autonomous flying object 32 included a predetermined time interval, for example a number of hours, days or weeks, for the duration of which the autonomous flying object 32 must complete its task, then that same information can be communicated from the service center 20 to the elevator controller 46 of the effected elevator installation 100 so that it can open or unlock a ventilation flap 48 in the hoistway after that predetermined time interval thus permitting the autonomous flying object 32 to leave or exit the hoistway 40.

Alternatively, if the access information provided to the autonomous flying object 32 included the specific job code, which was communicated separately from the service center 20 to the elevator controller 46 and stored, then as the autonomous flying object 32 approaches the ventilation flap 48, the job code can be read by a sensor 49 for example by NFC, RF or other wireless technologies and passed onto the elevator controller 46. If the code read from the autonomous flying object 32 matches the code communicated separately from the service center 20, then the elevator controller 46 can open or unlock a ventilation flap 48 to permit to the autonomous flying object 32 leave or exit the hoistway 40.

After leaving the hoistway of the elevator installation 100, the autonomous flying object 32 can be either sent either to another elevator installation 200, 300 to repeat its monitoring and inspecting tasks or to its base station 30.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method of inspecting and monitoring an elevator installation comprising the steps of:
   a) providing an autonomous flying object having at least one sensor;
   b) sending the autonomous flying object to the elevator installation;
   c) selectively providing the autonomous flying object access into and out of a hoistway of the elevator installation;
   d) positioning the autonomous flying object within the hoistway;
   e) sending data collected by the at least one sensor to a remote elevator service center; and
   f) wherein the remote elevator service center sends access information for the elevator installation to the autonomous flying object for selectively providing the access and the remote elevator service center sends an access instruction to the elevator installation for selectively providing the access.

2. The method according to claim 1 wherein the access information includes a specific timeframe for which access is granted to the autonomous flying object for entry into the hoistway of the elevator installation.

3. The method according to claim 1 wherein the access information includes a predetermined time interval in which the autonomous flying object must complete tasks.

4. The method according to claim 1 wherein the access information includes a specific code.

5. The method according to claim 1 wherein the access instruction includes a specific timeframe for the elevator installation to grant access to the autonomous flying object.

6. The method according to claim 1 wherein the access information includes a predetermined time interval after which the elevator installation will grant exit to the autonomous flying object.

7. The method according to claim 1 wherein the access information includes a specific code and further comprising providing a sensor at the elevator installation to read a code from the autonomous flying object, comparing the specific code with the code read by the sensor at the elevator installation from the autonomous flying object, and granting the autonomous flying object access to the hoistway if the code read from the autonomous flying object matches the specific code.

8. The method according to claim 1 further comprising providing the autonomous flying object exit from the hoistway of the elevator installation.

9. The method according to claim 8 further comprising sending the autonomous flying object to a base station.

10. The method according to claim 8 further comprising sending the autonomous flying object to another elevator installation and repeating the steps c. through e.

11. A system for remotely inspecting and monitoring an elevator installation comprising:
    a remote elevator service center;
    an autonomous flying object having at least one sensor;
    an access within the elevator installation to selectively permit the autonomous flying object with entry to and exit from an elevator hoistway of the elevator installation;
    a communication network to transmit data collected by the at least one sensor to the remote elevator service center; and
    a further sensor connected to an elevator controller of the elevator installation to read a code from the autonomous flying object when in a vicinity of the further sensor.

12. A method of inspecting and monitoring an elevator installation comprising the steps of:
    a) providing an autonomous flying object having at least one sensor;
    b) sending the autonomous flying object to the elevator installation;
    c) selectively providing the autonomous flying object access into and out of a hoistway of the elevator installation;
    d) positioning the autonomous flying object within the hoistway;
    e) sending data collected by the at least one sensor to a remote elevator service center; and
    f) wherein the remote elevator service center sends access information for the elevator installation to the autonomous flying object and sends an access instruction to the elevator installation.

* * * * *